No. 839,611. PATENTED DEC. 25, 1906.
A. S. MARTIN.
SPRING FISH HOOK.
APPLICATION FILED MAR. 15, 1906.
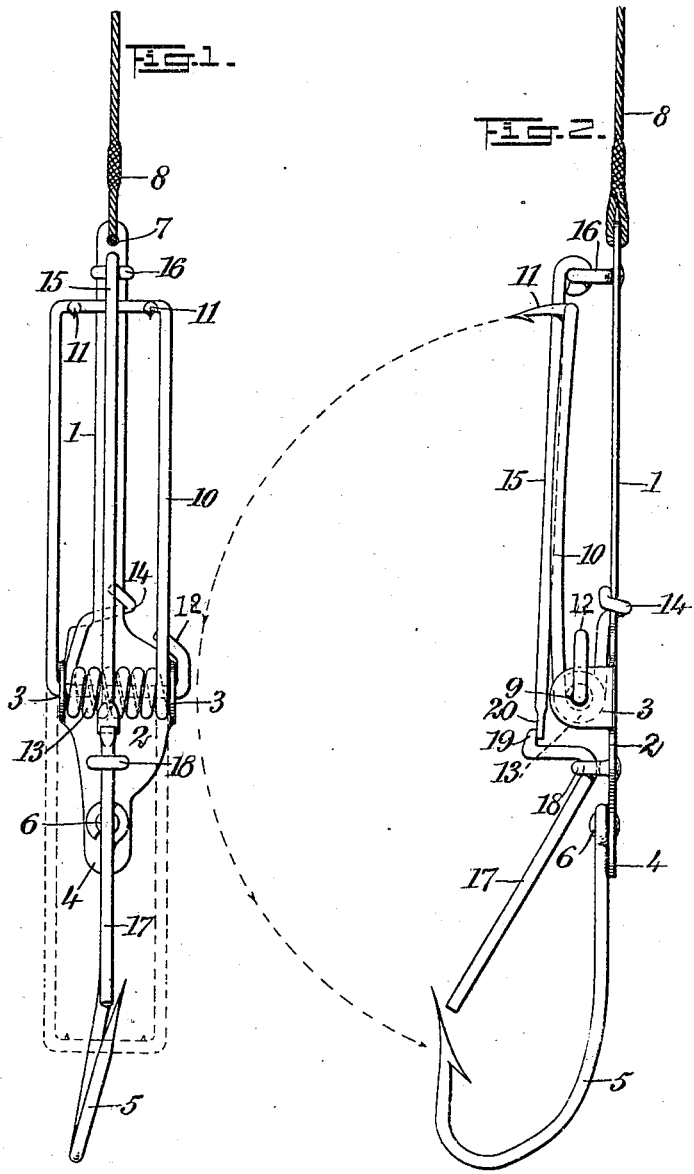
WITNESSES:
INVENTOR
Azor S. Martin
BY
ATTORNEYS

UNITED STATES PATENT OFFICE.

AZOR S. MARTIN, OF GENESEO, ILLINOIS.

SPRING FISH-HOOK.

No. 839,611.

Specification of Letters Patent.

Patented Dec. 25, 1906.

Application filed March 15, 1906. Serial No. 306,193.

*To all whom it may concern:*

Be it known that I, AZOR S. MARTIN, a citizen of the United States, and a resident of Geneseo, in the county of Henry and State of Illinois, have invented a new and Improved Spring Fish-Hook, of which the following is a full, clear, and exact description.

This invention relates to fish-hooks of the type in which a spring-actuated auxiliary hook or gaff is released when the fish strikes at the bait, thus allowing a plurality of hooks to obtain a firm hold upon the fish, and thereby prevent its escape, and the device is especially useful in the catching of quick-striking fish, such as trout or bass.

The object of the invention is to provide a simple, strong, and durable spring fish-hook which is extremely rapid in operation, is instantly actuated when the bait is taken, and which is only operated by an actual contact with the hook.

The invention consists in the construction and combination of parts, which will be set forth hereinafter and particularly pointed out in the claim.

Reference is to be had to the accompanying drawings, which illustrate, as an example, the preferred embodiment, in which drawings similar characters of reference indicate like parts in both the views, and in which—

Figure 1 is a front elevation of my invention, showing the auxiliary hook in a sprung position in dotted outline; and Fig. 2 is a side elevation showing the auxiliary hook when set.

Referring more particularly to the drawings, I provide an elongated plate 1, having a broadened part 2, provided with two ears 3, turned up at right angles to the plate. The plate terminates in an extension 4, to which is secured a fish-hook 5 of the usual type by means of a rivet 6. The plate 1 and the hook 5 may be formed from one piece of metal, if so desired. The plate 1 is provided at its upper extremity with a perforation 7, by means of which it can be secured to a line 8. The ears 3 are provided with holes 9, in which an auxiliary hook or gaff 10 is mounted. The gaff 10 is formed of steel wire or similar material and is provided with barbs 11. The wire is formed into the shape of a rectangle, having a transverse member mounted pivotally in the ears 3, while an end 12 of the wire is clenched about one of the ears. The other end of the wire is wound about a part mounted between the ears 3, thereby forming a helical spring 13, the end 14 of which is secured to the plate 1, whereby the spring tends to force the gaff downward against the hook 5. The barbs 11 of the gaff are formed on a transverse bar at the upper extremity thereof and are adapted to enter the head of the fish attacking the bait and firmly hold it when the gaff is released from its set position. The gaff is held in a set position by means of a trigger 17 and a latch 15, the latter being removably attached to the plate 1 by means of an eye 16 near the upper extremity of the plate. The latch rests against the upper transverse bar of the gaff between the barbs 11. The trigger is formed with an elbow and is loosely mounted in an eye 18, which is attached to the part 2 of the plate 1, near its lower end. The upper arm of the trigger 17 is provided with a finger 19, which engages with a flattened end 20 of the latch 15.

When the spring-hook is set, the gaff is forced back into the position shown in the drawings and the latch 15 placed over it, pressing against the upper transverse bar of the gaff between the barbs, and the end 20 is then caught under the finger 19 of the trigger 17, and thereby the latch is held in place. The lower end of the trigger is at an angle with the plate 1 and nearly closes the curvature opening of the hook 5, so that even a tentative attack upon the bait by the fish will force the trigger inward and release the latch, and subsequently the gaff swings downward, as shown by the dotted arc in Fig. 2, and thus fastens into the head of the fish. The lower arm of the trigger is normally within the curve of the hook when the gaff is set, so that the point of the hook extending beyond the arm to a certain extent protects the trigger and prevents the springing of the gaff should the hook catch against a hard substance at the bottom of the water. It will be understood, however, that the gaff will be sprung by even a slight action of the fish's mouth.

Having thus described the preferred form of my invention, what I claim as new, and desire to secure by Letters Patent, is—

A spring fish-hook, comprising a hook, a plate having lateral extensions, a gaff formed from spring material and having sides, a transverse bar and barbs on said transverse bar formed integral therewith, an end of one of said sides being laterally disposed and pivotally mounted in said extensions, an end of the other of said sides being disposed about said first end to form a spring adapted to force said gaff toward said hook, a latch-bar movably mounted upon said plate and adapted to extend over said gaff pressing against said transverse bar between said barbs to hold said gaff in a set position, and a trigger movably mounted upon said plate and adapted to engage with said latch-bar.

In testimony whereof I have signed my name to this specification in the presence of two subscribing witnesses.

AZOR S. MARTIN.

Witnesses:
PHINEAS MORROW,
ALBERT WEIMER.